United States Patent
Reinke

(10) Patent No.: US 9,522,447 B2
(45) Date of Patent: Dec. 20, 2016

(54) AUTOMOTIVE GLASS REMOVAL TOOL

(71) Applicant: HI-LEX CONTROLS, INC., Rochester Hills, MI (US)

(72) Inventor: Ryan Michael Reinke, Southfield, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 213 days.

(21) Appl. No.: 14/256,481

(22) Filed: Apr. 18, 2014

(65) Prior Publication Data

US 2015/0298268 A1    Oct. 22, 2015

(51) Int. Cl.
*B23P 19/04* (2006.01)
*E05F 11/38* (2006.01)

(52) U.S. Cl.
CPC .............. *B23P 19/04* (2013.01); *E05F 11/385* (2013.01); *E05Y 2800/692* (2013.01); *Y10T 29/49815* (2015.01); *Y10T 29/49819* (2015.01); *Y10T 29/49822* (2015.01)

(58) Field of Classification Search
CPC ... B23P 19/04; E05F 11/385; Y10T 29/49822; Y10T 29/49819; Y10T 29/49815; E05Y 2800/692
See application file for complete search history.

(56) References Cited

U.S. PATENT DOCUMENTS

| | | |
|---|---|---|
| 3,013,331 A | 2/1959 | Appenzeller |
| 3,208,134 A | 11/1961 | Krewson, Jr. |
| 4,649,613 A | 3/1987 | Bednarik |
| 4,688,761 A | 8/1987 | Wilcox |
| 4,926,537 A | 5/1990 | Pool |
| 5,907,927 A | 6/1999 | Lieb et al. |
| 5,992,099 A | 11/1999 | Thomas |
| 6,418,668 B1 | 7/2002 | Arquevaux |
| 6,453,617 B1 | 9/2002 | Klippert et al. |
| 7,409,797 B2 * | 8/2008 | Pound ............... E05F 11/385 49/375 |
| 2003/0061765 A1 | 4/2003 | Kawata et al. |
| 2008/0127473 A1 | 6/2008 | Yu |
| 2008/0244981 A1 | 10/2008 | Arimoto |
| 2010/0171083 A1 | 7/2010 | Vaught et al. |

* cited by examiner

*Primary Examiner* — John C Hong
(74) *Attorney, Agent, or Firm* — Brinks Gilson & Lione

(57) ABSTRACT

A glass removal tool for removing a glass panel from a window regulator clamp includes a horizontal cross bar; two parallel legs extending downward from the cross bar; at least one pair of ramps arranged between the parallel legs; and a vertical slot extending between the ramps of the pair of ramps. Two pairs of ramps may be included that are laterally offset from each other. The ramps may be recessed from the front surface and form at least one pair of wedges with the rear surface. The legs may include a first taper formed on the inner surface of each of the legs toward bottom ends of the legs and a second taper formed on the rear surface of the legs toward bottom ends of the legs.

16 Claims, 5 Drawing Sheets

AUTOMOTIVE GLASS REMOVAL TOOL

TECHNICAL FIELD

The present application relates to a glass removal tool for releasing a glass panel from a window clamp assembly. In particular, the present application relates to a glass removal tool for the disassembly of an automotive glass panel from a glass carrier clamp that has a snap-fit connection with a hole in the glass panel.

BACKGROUND

Automobiles generally feature side door glass which can be moved between lower, opened and upper, closed positions. A window regulator is used to support and move the glass between these positions. Window regulators require some means for mounting or attachment to the glass panel for securely moving the glass panel between the positions. Window regulators often include one or more window clamps, which are attached to the lower edge of the glass panel through various approaches. One approach uses a clamp which pinches the glass panel for attachment to obtain a friction lock with the glass panel. Additional adhesive may be used for securing the clamp. Another type includes a snap finger that engages with a hole through the glass formed near the lower edge of the glass panel.

For example, Published Patent Application US 2008/0244981 A1 discloses a clamp assembly formed as an injection molded polymer plastic part that features a U-shaped bridge section with a protruding snap finger located at its top center. A U-shaped bridge connects the snap finger with the remainder of the clamp. The clamp forms a slot between the bridge section and an upstanding wall for receiving the glass panel. During assembly of the clamp 14 onto the glass panel, a pointed edge section of the glass panel is inserted into the slot until it reaches the bottom of the slot. In this position, the snap finger snaps into a hole in the glass panel. US 2008/0244981 A1 is herewith incorporated by reference in its entirety.

Clamps with such a snap finger provide the benefit of positively locking the glass panel in place so that even extended use will not cause the glass panel to slip out of the clamps. In order to remove the glass panel from the clamp, however, the snap finger must be lifted out of the hole for releasing the glass panel. Accordingly, large access holes have been necessary for maneuvering a prying tool to the clamp to lift the snap finger out of the hole.

Thus, there is a continuing need for a glass removal tool that is small in size with reduced space requirements for lifting the snap finger from the hole when repairs are to be performed on the glass panel or on the window regulator.

SUMMARY OF THE INVENTION

According to a first aspect of the disclosure, a glass removal tool for removing a glass panel from a window regulator clamp includes a horizontal cross bar, at least one pair of ramps arranged under the cross bar, and a vertical slot extending between the ramps of the pair of ramps. This simple arrangement allows for a small size of the glass removal tool, especially in the vertical direction.

According to another aspect of the disclosure, the glass removal tool may include a first pair of ramps and a second pair of ramps laterally offset from each other. Including two or more pairs of ramps within one tool provides a versatility to remove clamps of various widths with a single tool. For example, the second pair of ramps may extend farther downward than the first pair of ramps. Additionally or alternatively, the first pair of ramps may be arranged laterally between the ramps of the second pair of ramps.

According to yet another aspect of the disclosure, the at least one pair of ramps may be arranged below a vertical planar surface extending from the cross bar to the at least one pair of ramps. The height of the planar surface can be dimensioned to account for the height difference between the snap finger of the clamp and engagement surfaces on the clamp that are engaged by the ramps. Horizontal ribs may extend between the at least one pair of ramps and the vertical planar surface to aid retention of the window regulator clamp on the glass removal tool.

According to and additional aspect of the disclosure, two parallel legs may extend downward from the cross bar on opposite lateral ends of the cross bar.

According to a further aspect of the disclosure, the cross bar and the parallel legs define a front surface, from which the ramps may be recessed and may form wedges with a rear surface of the glass removal tool. This arrangement ensures that, when the glass removal tool is slid downward along a glass panel, the ramps slide along the glass panel as well and wedge themselves between the glass panel and the clamp.

According to another aspect of the disclosure, each of the parallel legs may have a first taper formed on the inner surface of the legs toward bottom ends of the legs. The first taper promotes a lateral self-alignment of the glass removal tool with respect to the clamp to be removed.

According to a further aspect of the disclosure, the legs may include a second taper formed on the rear surface of the legs toward bottom ends of the legs. The second taper facilitates the alignment of the glass removal tool on the glass panel on both lateral sides of the clamp.

According to yet another aspect of the disclosure, the glass removal tool may be made of molded plastic, which saves manufacturing costs. The glass removal tool may even consist entirely of molded plastic.

According to yet another aspect of the disclosure, the glass removal tool may have a rear surface defined by a honeycomb structure having webs terminating in a common plane. Such a honeycomb structure reduces weight and material costs, while still providing a sufficient structural integrity for releasing window regulator clamps. Further details and benefits become apparent from the description of the appended drawings.

BRIEF DESCRIPTION OF THE DRAWINGS

The drawings are included herewith for purely illustrative purposes and are not intended to limit the scope of the present invention.

In the drawings.

DETAILED DESCRIPTION OF THE DRAWINGS

Figure 1:
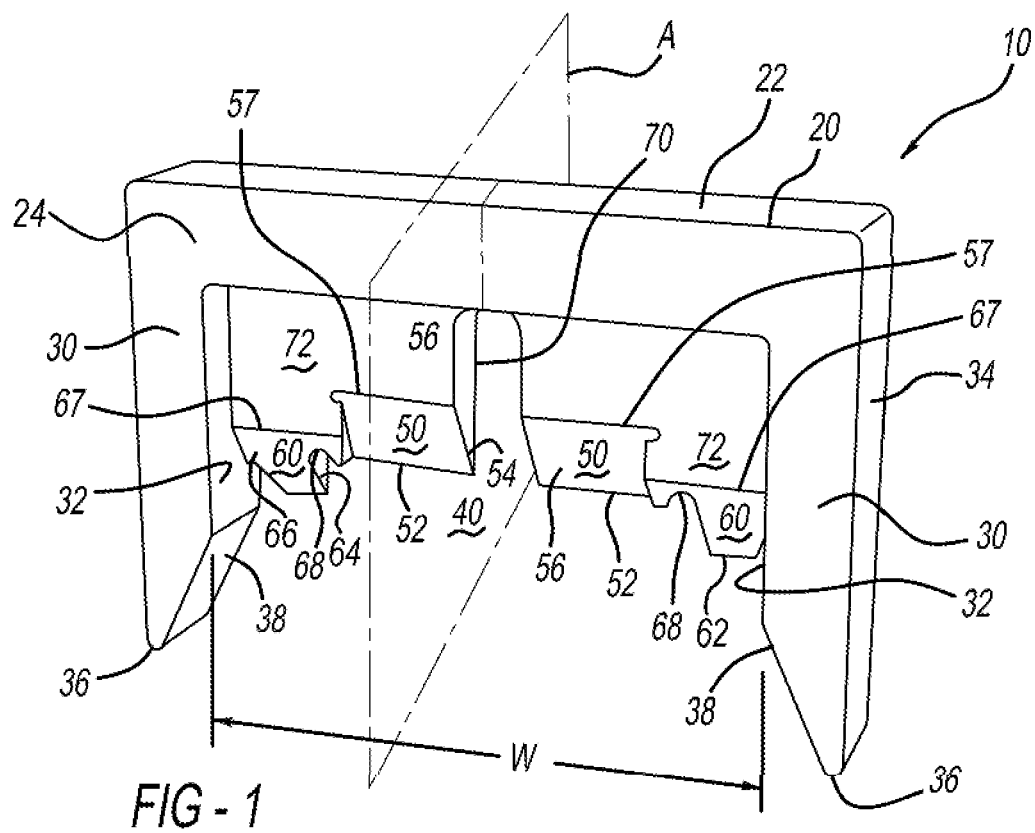
FIG. 1 shows a perspective front view of a glass removal tool for automotive glass panes from a window regulator clamp.

In the following description, the terms "vertical" and "horizontal" as well as related terms, including but not limited to "lateral," "up," and "down," relate to orientations as shown in the drawings and may not be actual orientations during operation of the described device.

Figure 2:
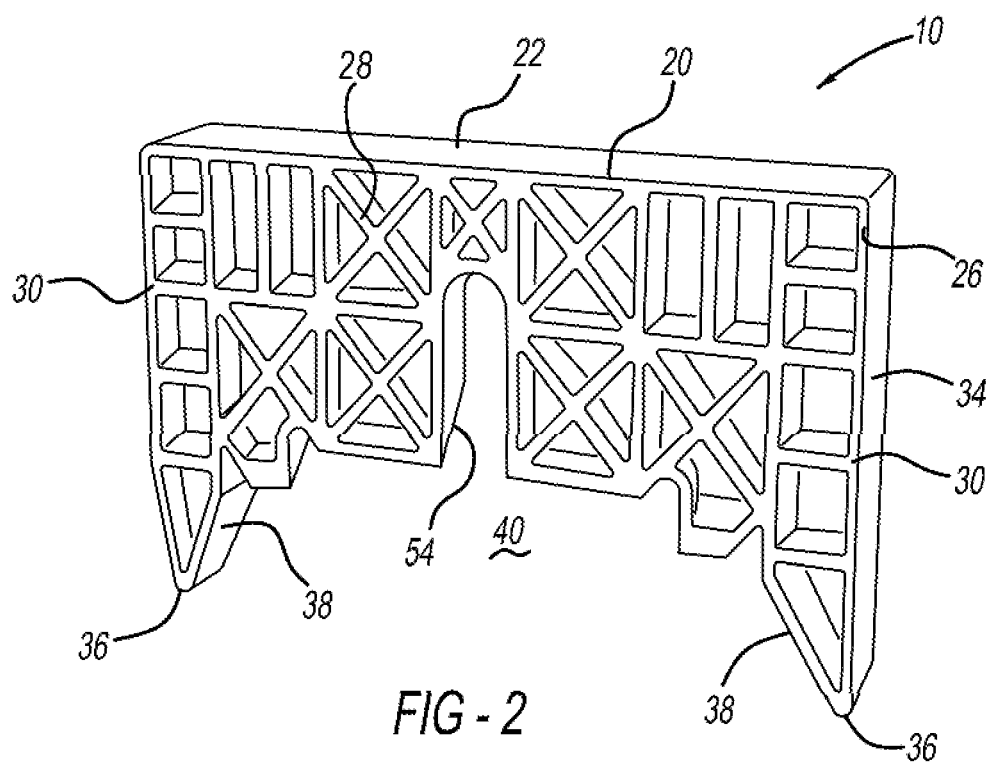
FIG. 2 shows a perspective rear view of the glass removal tool of FIG. 1.
Figure 3:
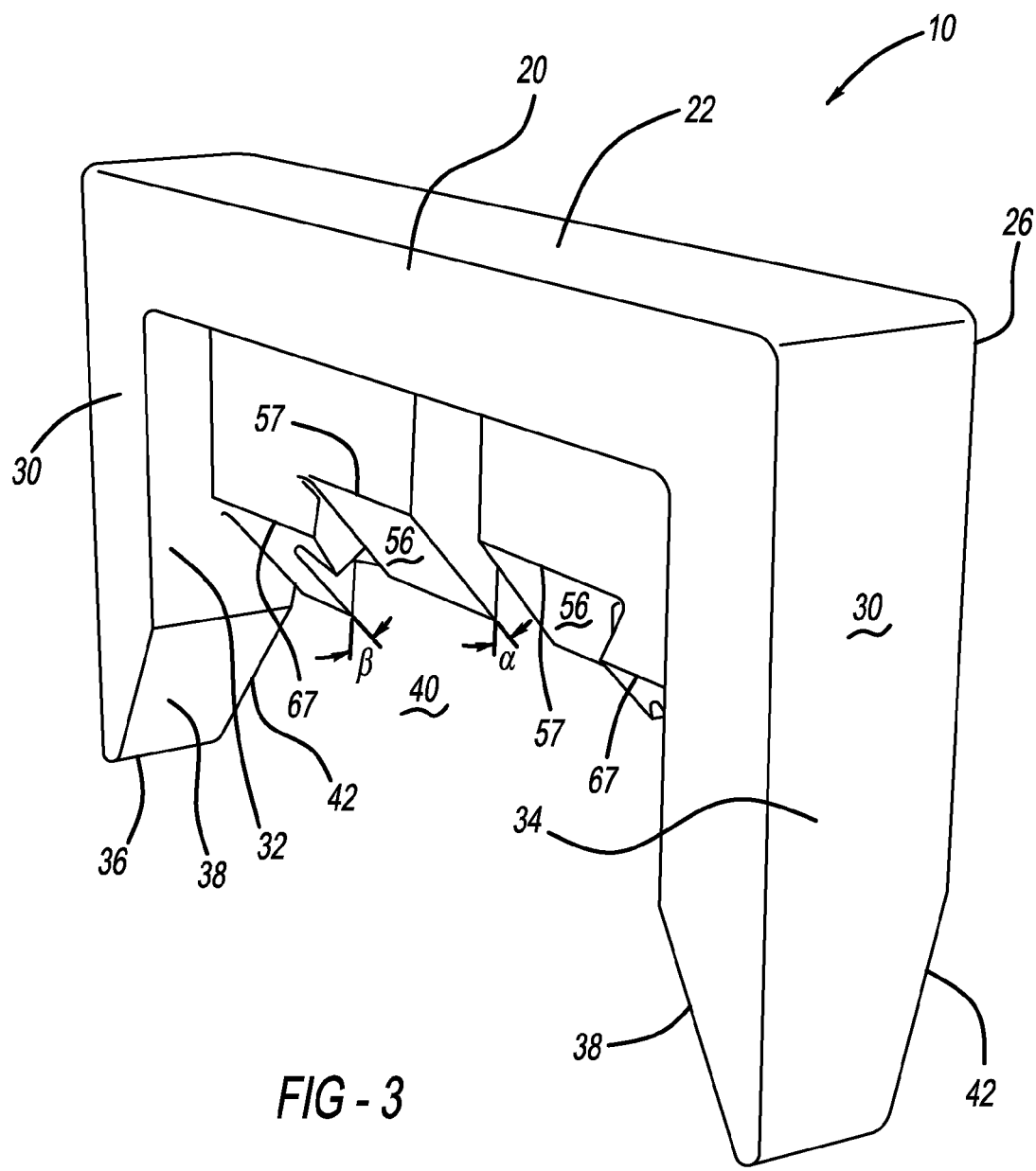
FIG. 3 shows a perspective side view of the glass removal tool of FIG. 1.

Referring to FIGS. 1 through 3, a compact glass removal tool 10 is shown that is adapted to remove a glass panel 104 of a vehicle window from clamps 100 securing the glass panel 104 to a window regulator. The glass removal tool 10 is specifically shaped to be compatible with various clamp designs that use a snap finger to engage a hole in a glass panel. An reference numerals referring to features of the clamp 100 or of the glass panel 104 are evident from FIGS. 4a, 4b, 5a, and 5b, which depict an example of the clamp 100 and of the glass panel 104 that can be released with the glass removal tool.

The glass removal tool 10 includes a cross bar 20 defining a horizontal top surface 22, a front surface 24 to face the window regulator during operation, and rear surface 26 to face the glass panel during operation. Two parallel legs 30 of equal length extend downward from the cross bar 20. The legs 30 have laterally inner sides 32 defining an inner width W. and laterally outer sides 34. The inner width W is dimensioned to be wider than the lateral width of the widest clamp to be opened. The legs 30 have leg ends 36 remote from the cross bar 20 that define a bottom of the glass removal tool 10.

The outer sides of the legs 30 extend straight downward. On other sides, the legs 30 have tapered surfaces for guiding the glass removal tool 10 into a proper position for opening the clamp. A first taper 38 is formed on the inner side 32 of each of the legs 30, i.e. on the surfaces facing each other. The first taper 38 is outwardly sloped toward the leg ends 36 for lateral positioning of the legs 30 on both sides of the clamp 100. A second taper 42 is formed on the rear surface 26 of the legs 30 toward the leg ends 36 for inserting the glass removal tool 10 between regulator and the glass panel 104 by sliding leg ends 36 along the glass panel 104 in a downward direction.

Between the legs 30 and extending from the cross bar 20, the glass removal tool 10 has an inner space 40 between legs 30 with an arrangement of ramps 50 and 60 that are recessed from the front surface 24 of glass removal tool 10. A central, vertical slot 70 clears a central portion of the inner space 40 of glass removal tool 10 from all material up to the cross bar 20. The vertical slot 70 has a width dimensioned to be at least as wide as a snap finger 114 of any of the types of clamps 100 to be released by the glass removal tool 10.

The ramps 50 and 60 are formed in pairs symmetrically arranged on lateral sides of the vertical slot 70. A first pair 50 of ramps is directly adjacent the vertical slot 70. The first pair of ramps 50 has a ramp edge 52 that is located at about half of the interior height of the glass removal tool 10 between the legs 30 and under the cross bar 20. The first pair of ramps 50 forms two downward directed wedges 54 composed of the rear surface 26 and of sloped surfaces 56 formed by the ramps 50. The ramp angle α between the rear surface 26 and the sloped surfaces 56 is shown as about 40° to 45°. The ramp angle α, however, may be smaller or larger, depending on the dimensions of the clamp, on the downward travel distance of the glass removal tool 10 during operation, and on the length of the snap finger 114 to be lifted out of the hole in the glass panel.

The second pair of ramps 60 is arranged laterally outward from the first pair of ramps. The second pair of ramps 60 has a ramp edge 62 that is located at about one third of the interior height of the glass removal tool 10 between the legs 30 and under the cross bar 20, slightly above the upper end of the first taper 38. Like the first pair of ramps 50, the second pair of ramps 60 forms two downward directed wedges 64 composed of the rear surface 26 and of sloped surfaces 66 formed by the ramps 60. The ramp angle β between the rear surface 26 and the sloped surfaces 66 is shown as about 40° to 45°, but may be varied under similar considerations as the first set of ramps 50. Ramp angles α and β may be alike or differ from each other. Unlike the first set of ramps 50, the second set of ramps 60 includes vertical cutouts 68 that account for the anatomy of a clamp, which may have reinforcement struts or ribs that would otherwise block the wedges 64. Such cutouts may alternatively or additionally be provided for the first set of ramps 50, depending on the clamp shape.

A planar vertical lateral surface 72 extends from the upper edges of ramps 50 and 60 upward to the cross bar 20 on both lateral sides of the vertical slot 70. The vertical lateral surface 72 has a distance from the rear surface 26 that corresponds to at least the length of the snap finger 114 on the clamp 100 (shown in FIG. 5a) so that, if the vertical lateral surface 72 rests between the glass panel and a clamp arm carrying the snap finger, the snap finger does not reach into the hole in the glass panel. As evident in particular in FIG. 3, the upper edges of first and second pairs of ramps 50 and 60 transition into the vertical lateral surface 72 via protruding horizontal ribs 57 and 67 that are optionally provided to retain the clamp arm 110 on the vertical lateral surface when the glass panel 104 is pulled out of the clamp 100.

Due to the shown arrangement, the glass removal tool 10 is adapted for opening at least two different types of clamps of different widths and different height differences between the snap finger and engagement surfaces that interact with the glass removal tool 10. The first pair of rams 50 cooperates with smaller clamps having a smaller width and smaller height difference than the second pair of ramps 60.

As evident in particular in FIG. 3, the upper edges of first and second pairs of ramps 50 and 60 transition into the vertical lateral surface 72 via protruding horizontal ribs 57 and 67 that are optionally provided to retain the clamp arm 110 on the vertical lateral surface when the glass panel 104 is pulled out of the clamp 100.

In the shown embodiment, the glass removal tool 10 possesses mirror symmetry with respect to a vertical plane A extending perpendicular to the cross bar 20 and centrally intersecting the cross bar 20 as indicated in FIG. 1.

FIG. 2 shows the rear surface 26 of the glass removal tool 10. The rear surface 26 of the shown embodiment of the glass removal tool 10 is formed by reinforcing webs 28 that extend from the front surface 24 and from the ramps 50 and 60. The webs terminate in one common plane that forms the rear surface 26. By forming a honeycomb-like structure, the webs 28 reduce the amount of material needed for manufacturing the glass removal tool 10, while still ensuring structural integrity of the glass removal tool 10. Because the rear surface 26 merely makes contact with the glass panel, no planar structure is necessary.

In the shown embodiment, the glass removal tool 10 is a molded polymer plastic part. Because the clamps used for attaching the glass panel to the window regulator are typically also made of plastic, the plastic glass removal tool 10 is sufficiently hard and sturdy for accomplishing the task of opening the clamp 100 and lifting the snap finger 114 out of engagement with the hole 102 in the glass panel 104. Other materials, however, are well within the scope of the present disclosure.

Figure 6:
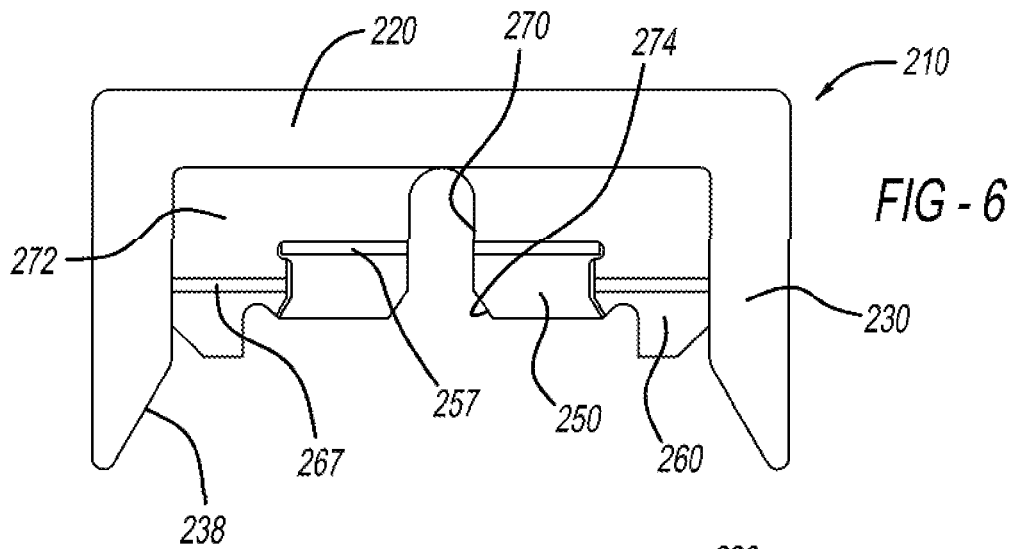
FIG. 6 shows a front view of a second embodiment of a glass removal tool for automotive glass panes from a window regulator clamp.
Figure 7:
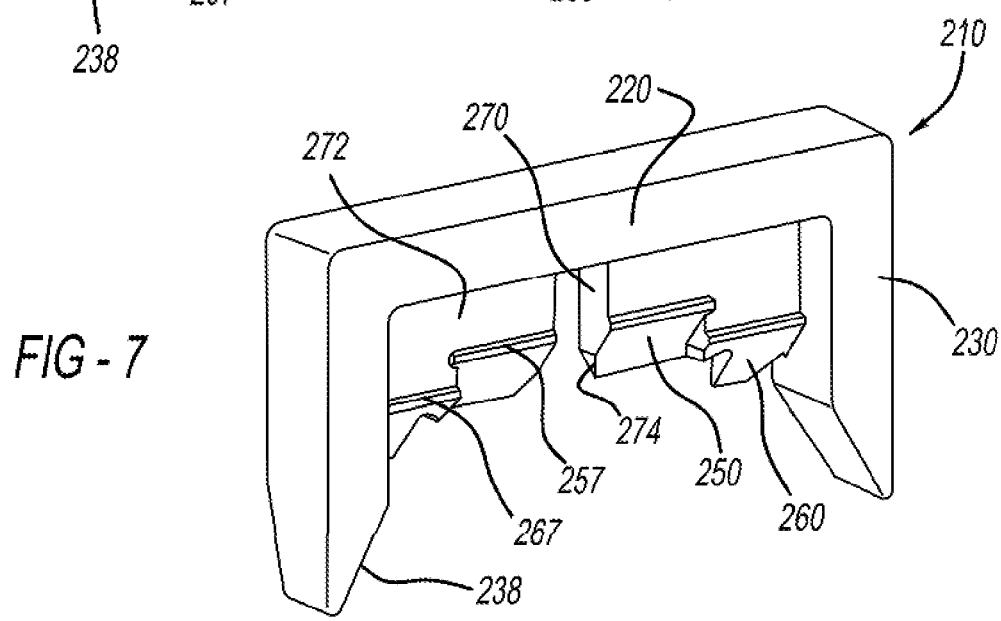
FIG. 7 shows a perspective front view of the glass removal tool of FIG. 6.

A first alternative embodiment of the glass removal tool 10 is shown in FIGS. 6 and 7 as glass removal tool 210. Cross bar 220, legs 230, the second pair of ramps 260 including horizontal ribs 267 and vertical lateral surface 272 are identical or similar to the embodiment shown in FIGS. 1 through 3. The vertical slot 270, however, is formed with a slot taper 274 widening the bottom end of the vertical slot 270. Thus the slot taper 274 affects the shape of the first pair of ramps 250, which have an angled laterally inner edge that is formed by the vertical slot 270. The slot taper 274 has a similar function as the first taper 238 on legs 230. The slot taper 274 provides an additional or alternative lateral centering chamfer that centers the glass removal tool 210 by funneling the snap finger 114 into the vertical slot.

Figure 8:
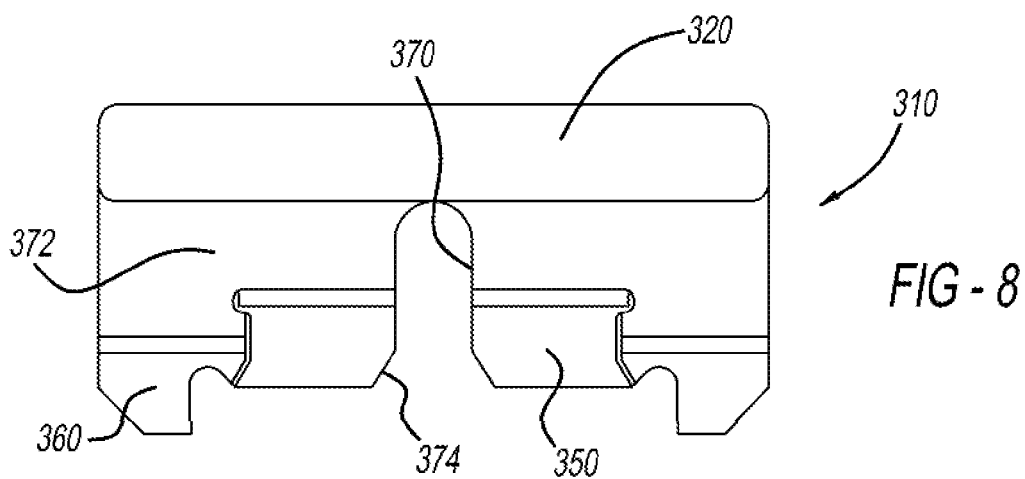
FIG. 8 shows a front view of a third embodiment of a glass removal tool for automotive glass panes from a window regulator clamp.

In a further variation, FIG. 8 shows a second alternative embodiment of a glass removal tool 310 according to the present invention, which includes a cross bar 320, but no lateral legs. The cross bar 320, the second pair of ramps 360, and the vertical lateral surface 372 thus form lateral outer edges of the glass removal tool 310. The vertical slot 370 is formed with a slot taper 374 like the embodiment of FIGS. 6 and 7, widening the bottom end of the vertical slot 370. Thus the first pair of ramps 350 has an angled laterally inner edge that is formed by the vertical slot 370. The slot taper 374 of glass removal tool 310 provides a lateral centering chamfer that centers the glass removal tool 310 by funneling the snap finger 114 into the vertical slot. Tapered legs may thus be omitted as shown. This further reduces the size of the glass removal tool 310.

Figure 4A:
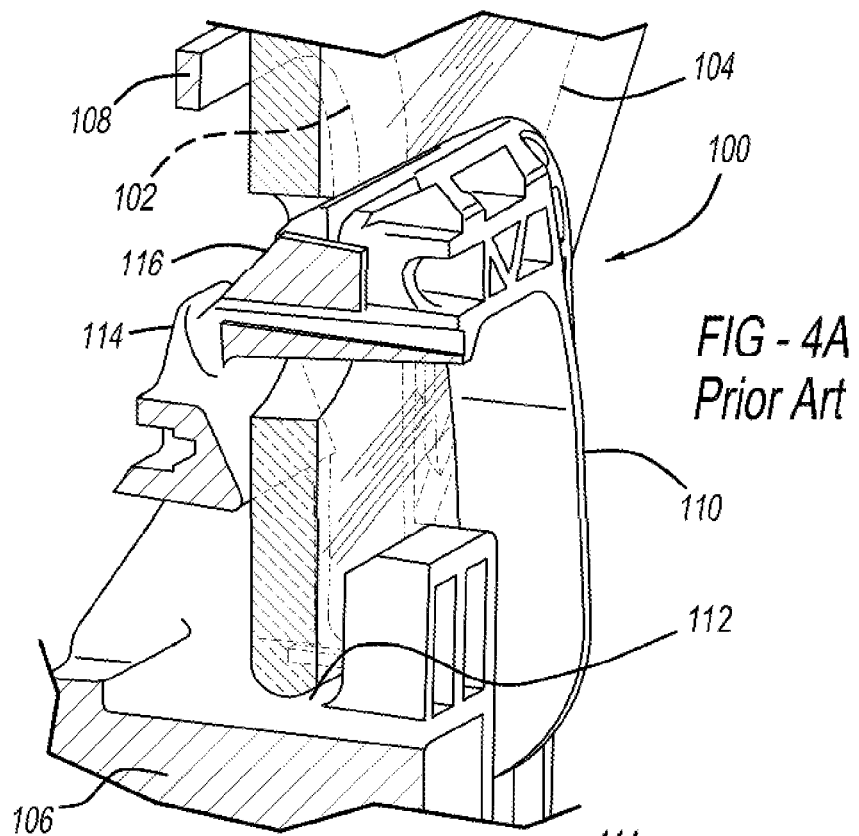
FIG. 4a shows a cross-sectional view of a windows regulator clamp engaged with a hole in a glass panel.
Figure 4B:
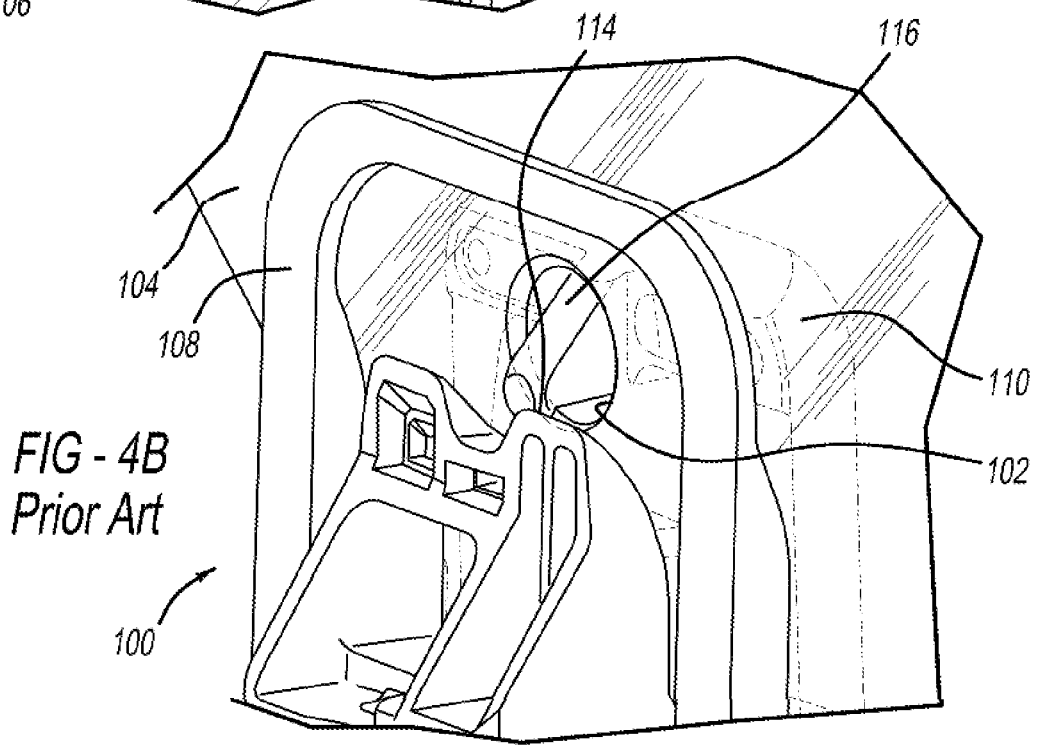
FIG. 4b shows an alternative view of the window regulator clamp of FIG. 4a engaged with the hole in the glass panel.

FIGS. 4a and 4b show an example of a window regulator clamp 100 engaged with a hole 102 of a glass panel 104. As shown, clamp 100 is preferably formed as an injection molded polymer plastic part and features a bottom bridge section 106, from which arms 108 and 110 extend upward. Arm 110 includes a snap finger 114 located at its top center, which protrudes toward arm 108. Clamp 100 defines a clamp slot 112 formed by bridge section 106 and arms 108 and 110. The clamp slot 112 receives glass panel 104. Clamp slot 112 has a shape to engage with the lower edge of glass panel 104. During assembly of clamp 100 onto glass panel 104, the edge of glass panel 104 is inserted into clamp slot 112, and shoulders 116 on arms 108 and 110 guide the clamp 100 into its proper position. Snap finger 114 has a sloped leading edge 116 to cause it to deflect as glass panel 104 is inserted during assembly. Once the glass panel reaches the bottom of clamp slot 112, the snap finger 114 snaps into and extends through the hole 102 of the glass panel 104.

Figure 5A:
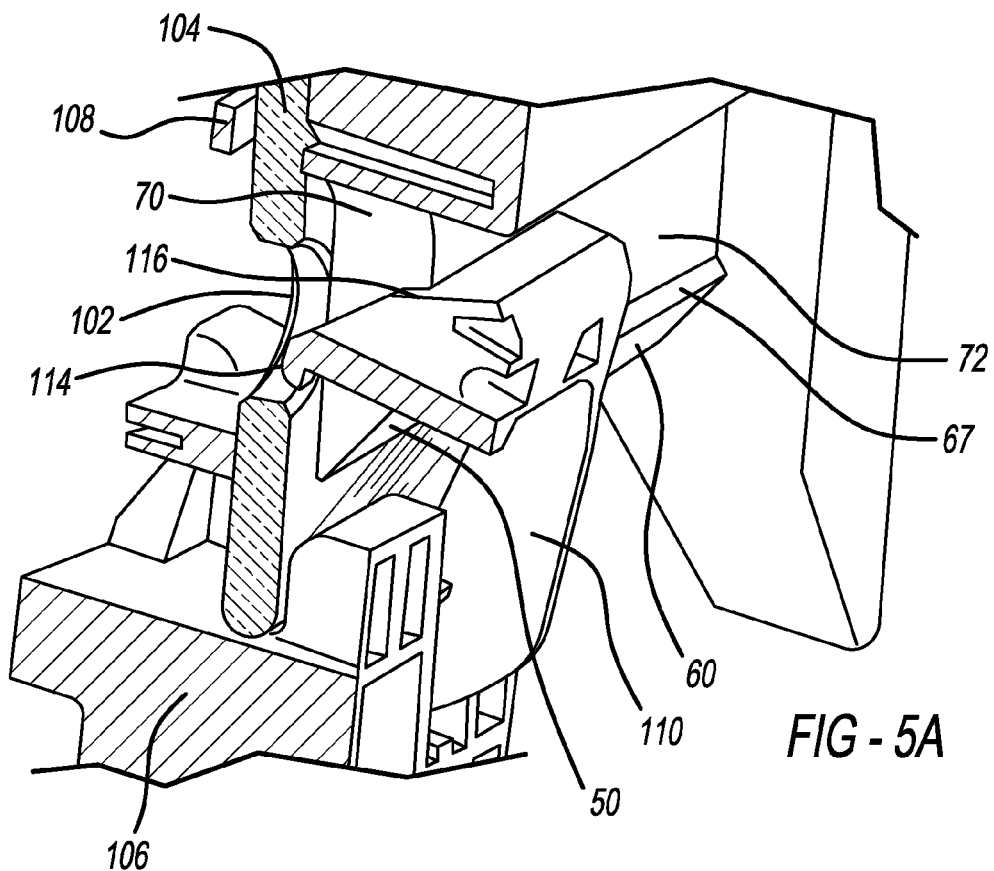
FIG. 5a shows a cross-sectional view of the windows regulator clamp of FIGS. 4a and 4b disengaged from the hole in the glass panel by the glass removal tool of FIGS. 1 and 2.
Figure 5B:
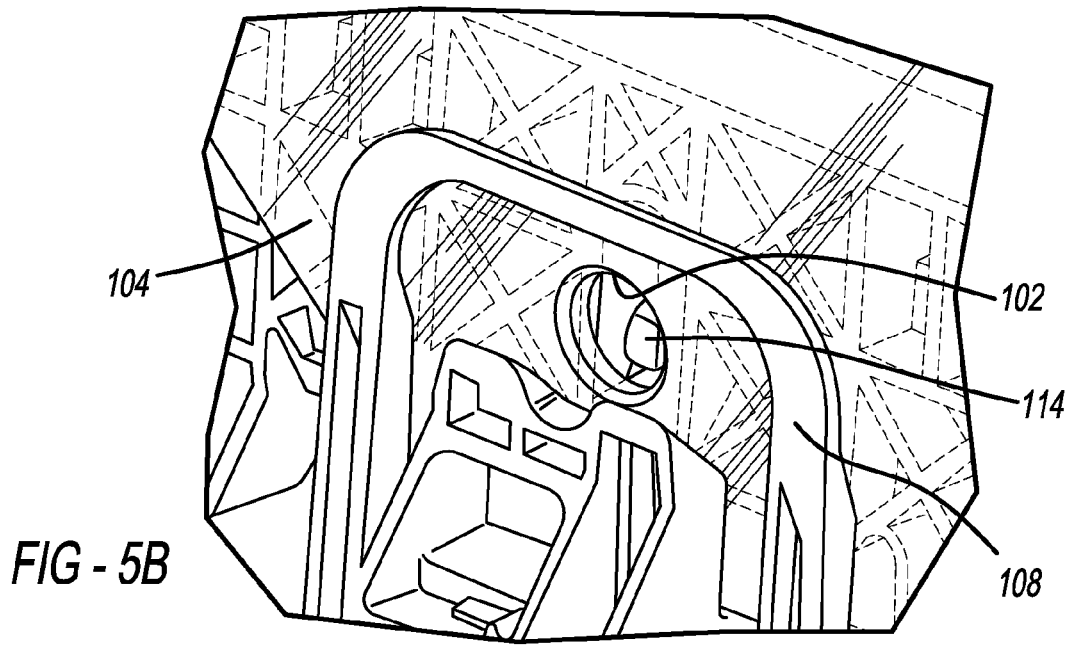
FIG. 5b shows an alternative view of the window regulator clamp of FIGS. 4a and 4b disengaged from the hole in the glass panel by the glass removal tool of FIGS. 1 and 2.

FIGS. 5a and 5b show the operation of the glass removal tool 10 of FIGS. 1-3. The operation of glass removal tools 210 and 310 of FIGS. 6 through 8 is very similar, except that slot tapers 274 and 374 may operate as guide chamfer for positioning the snap finger 114 into the vertical slot 70 so that the first taper may supplement the function of the slot taper or may be omitted. As illustrated in FIGS. 5a and 5b, the operation of the glass removal tool 10 involves placing the rear surface 26 of the glass removal tool 10 on the glass panel 104 on the side, on which the snap finger 114 is attached to the clamp arm 110. Subsequently, the glass removal tool 10 is slid downward along the glass panel 104 until one pair of the ramps 50 and 60—in this example ramps 50—engages the arm 110 of the clamp 10 on both lateral sides. The first taper 38 may aid in the lateral alignment of the glass removal tool 10 relative to the clamp 100 by funneling the clamp 100 between the legs 30 of the glass removal tool 10.

As the glass removal tool 10 is moved downward, the snap finger 114 moves into the vertical slot 70. The clamp arm 110 carrying the snap finger 114 moves up the ramps 50 until it reaches the planar surface 72. Because the planar surface 72 has a distance from the rear surface 26 that is at least as large as the depth at which the snap finger 114 penetrates the hole 102 in the glass panel 104, the snap finger 114 is disengaged from the hole 102 in glass panel 104 once the clamp arm 110 rests on the planar surface 72. Accordingly, the glass panel 104 is now free from the positive lock of the snap finger 114 and can be moved upward and out of the clamp 100. The ribs 57 on ramps 50 prevent the glass removal tool 10 from slipping out of clamp 100 while removing the glass panel 104.

The foregoing description of an embodiment of the invention has been presented for purposes of illustration and description. It is not intended to be exhaustive or to limit the invention to the precise embodiments disclosed. Numerous modifications or variations are possible in light of the above teachings. The embodiments discussed was chosen and described to provide the best illustration of the principles of the invention and its practical application to thereby enable one of ordinary skill in the art to utilize the invention with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A glass removal tool for removing a glass panel from a window regulator clamp, the glass removal tool comprising:
    a rear surface configured to face the glass panel;
    a horizontal cross bar;
    at least a first pair of ramps and a second pair of ramps arranged under the cross bar, each of the first and second pairs of ramps forming a pair of wedges with the rear surface; and
    a vertical slot extending between the ramps of the pair of ramps.

2. The glass removal tool of claim 1, wherein the first pair of ramps and the second pair of ramps are laterally offset from each other.

3. The glass removal tool of claim 2, wherein the second pair of ramps extends farther downward than the first pair of ramps.

4. The glass removal tool of claim 2, wherein the first pair of ramps is arranged laterally between the ramps of the second pair of ramps.

5. The glass removal tool of claim 1, wherein the first and second pairs of ramps are arranged below a vertical planar surface extending from the cross bar to the first and second pairs of ramps.

6. The glass removal tool of claim 5, further comprising horizontal ribs between the first and second pairs of ramps and the vertical planar surface.

7. The glass removal tool of claim 1, further comprising two parallel legs extending downward from the cross bar on opposite lateral ends of the cross bar.

8. The glass removal tool of claim 7, wherein the cross bar and the parallel legs define a front surface, the first and second pairs of ramps being recessed from the front surface.

9. The glass removal tool of claim 7, wherein each of the parallel legs has an inner surface facing the inner surface of the other leg, the legs including a first taper formed on the inner surface of each of the legs toward bottom ends of the legs.

10. The glass removal tool of claim 7, wherein the cross bar and the parallel legs define a front surface and a rear surface, the legs including a second taper formed on the rear surface of the legs toward bottom ends of the legs.

11. The glass removal tool of claim 1, wherein the slot has a bottom end with a slot taper laterally widening the slot at the bottom end.

12. The glass removal tool of claim 1, wherein the glass removal tool is made of molded plastic.

13. The glass removal tool of claim 1, wherein the glass removal tool consists of molded plastic.

14. The glass removal tool of claim 1, wherein the glass removal tool has a rear surface defined by a honeycomb structure having webs terminating in a common plane forming the rear surface.

15. A method of releasing a glass panel with a hole from a window regulator clamp with a snap finger engaging the hole, the method comprising the steps of:
providing a glass removal tool with at least two pairs of ramps arranged between parallel legs and with a vertical slot extending between the ramps of the at least two pairs of ramps, the at least two pairs of ramps forming pairs of wedges with a rear surface configured to face the glass panel;
placing the rear surface of the glass removal tool on a side of the glass panel, on which the snap finger is attached to the clamp;
sliding the glass removal tool downward along the glass panel until one pair of the ramps engages the clamp; and
moving the glass removal tool further downward while guiding the snap finger in the slot until the clamp is opened far enough that the snap finger is disengaged from the hole.

16. The method of claim 15, further including the step of moving the glass panel upward and out of the clamp.

\* \* \* \* \*